US006407524B1

(12) United States Patent
Endo et al.

(10) Patent No.: US 6,407,524 B1
(45) Date of Patent: Jun. 18, 2002

(54) CONTROL APPARATUS FOR AN ELECTRICAL POWER STEERING APPARATUS

(75) Inventors: Shuji Endo; Hui Chen, both of Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/622,465

(22) PCT Filed: Dec. 17, 1999

(86) PCT No.: PCT/JP99/07112

§ 371 (c)(1),
(2), (4) Date: Oct. 18, 2000

(87) PCT Pub. No.: WO00/38969

PCT Pub. Date: Jul. 6, 2000

(30) Foreign Application Priority Data

Dec. 24, 1998 (JP) .......................................... 10-366553
Aug. 18, 1999 (JP) .......................................... 11-231345

(51) Int. Cl.[7] ................................................ H02P 7/00

(52) U.S. Cl. ....................... 318/432; 318/433; 318/798; 318/802; 318/803

(58) Field of Search ................................ 318/432, 433, 318/798, 802, 803; 180/6.2, 6.24

(56) References Cited

U.S. PATENT DOCUMENTS 5,743,352 A * 4/1998 Miller et al. ................ 318/798
5,982,067 A * 11/1999 Sebastian et al. ........... 318/439
6,122,579 A * 9/2000 Collier-Hallman et al. . 318/432

FOREIGN PATENT DOCUMENTS

JP 2-193768 7/1990
JP 6-344927 12/1994
JP 8-290778 11/1996
JP 10-310072 11/1998
JP 10-324262 12/1998
JP 10-337085 12/1998

* cited by examiner

*Primary Examiner*—Karen Masih
(74) *Attorney, Agent, or Firm*—Sughrue Mion, PLLC

(57) ABSTRACT

A control apparatus for an electrical power steering apparatus whereby a high output, small motor can be achieved, variation in the relative magnetization and coil positions and position detection precision requirements can be alleviated, steering feeling is improved, and apparatus cost is reduced. In a control apparatus for an electrical power steering apparatus for controlling a motor applying steering assistance force to a steering mechanism based on a current control value calculated from the current of a dc motor or brushless motor and a steering assistance control value calculated based on steering torque occurring at the steering shaft, torque ripple of the motor is suppressed to 10% or less.

5 Claims, 16 Drawing Sheets

COGGING TORQUE

FIG. 16

TORQUE PULSE

FIG. 17

TORQUE CHANGE

FIG. 18

TORQUE VARIATION

FIG. 19

CONTROL APPARATUS FOR AN ELECTRICAL POWER STEERING APPARATUS

FIELD OF THE INVENTION

The present invention relates to a control apparatus for an electrical power steering apparatus for applying steering assistance force by means of a motor to the steering system of an automobile or vehicle, and relates more particularly to a control apparatus for an electrical power steering apparatus whereby torque ripple is reduced and steering feel is improved using a DC motor or a brushless motor.

RELATED ART

Electric power steering systems that use the torque from a motor to assist the steering system of an automobile or other vehicle use a transfer mechanism such as gears or belts to transfer drive power from the motor via a speed reducer to assist turning the steering shaft or rack shaft. Such conventional electrical power steering systems use motor current feedback control to accurately generate the assistance torque (steering assistance torque). Feedback control adjusts the voltage applied to the motor so that the difference between the current control value and the detected motor current becomes smaller, and adjusting the voltage applied to the motor is generally accomplished by adjusting the duty ratio of PWM (Pulse Width Modulation) control.

To describe the general structure of an electrical power steering system with reference to FIG. 1, a shaft 2 of a steering wheel 1 is connected to tie rod 6 of the steering wheels by way of speed reducer gear 3, universal joints 4*a* and 4*b*, and rack and pinion mechanism 5. A torque sensor 10 for detecting the steering torque of steering wheel 1 is disposed to the shaft 2, and a motor 20 for assisting the steering power of the steering wheel 1 is linked to the shaft 2 by intervening a clutch 21 and speed reducer gear 3. Power is supplied by way of ignition key 11 and relay 13 from a battery 14 to a control unit 30, which controls the power steering system; the control unit 30 calculates steering assistance command value I of the assistance command based on steering torque T detected by the torque sensor 10 and speed V detected by a vehicle speed sensor 12, and controls the current supplied to the motor 20 based on the calculated steering assistance command value I. The clutch 21 is turned on and off by the control unit 30, and is on (engaged) during normal operating conditions. When the power steering system is determined by the control unit 30 to have failed, and when the power (voltage Vb) from the battery 14 is turned off by the ignition key 11 and the relay 13, the clutch 21 is off (disengaged).

The control unit 30 consists primarily of a CPU; the general functions executed by a program in the CPU are as shown in FIG. 2. For example, phase compensator 31 does not indicate a phase compensator provided as a separate hardware component, but rather indicates a phase compensation function executed by the CPU. To describe the functions and operation of the control unit 30, steering torque T detected and inputted by the torque sensor 10 is phase-compensated by a phase compensator 31 to improve the stability of the steering system, and the phase-compensated steering torque TA is then inputted to a steering assistance command value calculator 32. The steering assistance command value calculator 32 determines the steering assistance command value I, which is the control target of the current supplied to the motor 20, based on the input steering torque TA and speed V. The steering assistance command value I is inputted to a subtracter 30A and a differential compensator 34 of the feed forward system for improving response speed, the deviation (I−i) of the subtracter 30A is inputted to a proportional calculator 35, and the proportional output is inputted to an adder 30B and an integral operator 36. Outputs from the differential compensator 34 and the integral operator 36 are also additively inputted to the adder 30B, and the resulting current control value E, that is, the sum obtained by the adder 30B, is inputted to a motor drive circuit 37 as the motor drive signal. Motor current i of the motor 20 is detected by a motor current detecting circuit 38, and the motor current i is inputted to the subtracter 30A and is fed back.

To describe the structure of the motor drive circuit 37 with reference to FIG. 3, the motor drive circuit 37 comprises an FET gate driver 371 for driving the gates of field effect transistors (FET) FET1 to FET4 based on the current control value E from the adder 30B, an H-bridge consisting of FET1 to FET4, and a step-up power supply 372 for driving the high side of FET1 and FET2. FET1 and FET2 are switched on and off by a PWM (pulse width modulation) signal of duty ratio D1 determined based on the current control value E, and the size of current Ir actually flowing to the motor 20 is controlled. FET3 and FET4 are driven by a PWM signal of duty ratio D2, defined by a specific first degree equation ($D2=a \cdot D1+b$, where a and b are constants) in the range where duty ratio D1 is small, and go on/off according to the direction of the motor 20 rotation, which is determined by the sign of the PWM signal, after duty ratio D2 reaches 100%. For example, when continuity exists through FET3, current flows through FET1, the motor 20, FET3, and resistor R1, and forward current flows to the motor 20. When continuity exists through FET4, current flows through FET2, the motor 20, FET4, and resistor R2, and reverse current flows to the motor 20. Therefore, current control value E from the adder 30B is also PWM-output. The motor current detecting circuit 38 detects the size of the forward current based on the voltage drop at both ends of resistor R1, and detects the size in the reverse direction based on the voltage drop at both ends of resistor R2. The motor current i detected by the motor current detecting circuit 38 is inputted to the subtracter 30A for feedback.

In conjunction with the desire for high output in such conventional electrical power steering systems, there has also been demand for systems achieving a sense of high quality steering, as well as a small size due to layout considerations. To achieve a sense of high quality, it is necessary achieve a feeling of smooth steering. The torque ripple of the motor is generally the factor that determines whether smooth steering is achieved, and measures have been conventionally taken to reduce the torque ripple of the motor as a means of achieving smooth steering. However, conventional technology for reducing motor torque ripple typically reduces the center angle of the magnet in the motor or applies a skew angle to the magnet. In either case, if torque output is maintained, overall motor size increases such that the desire for smaller size cannot be satisfied.

On the other hand, rare earth magnets with high residual magnetic flux density have been used in brushless motors in conjunction with demand for high output and small size in conventional electrical power steering systems. However, smooth steering in response to the operator's manipulation of the steering wheel is needed even with brushless motors, and there is therefore a great need to reduce the motor's torque ripple and cogging torque.

A motor with a small skew angle and magnetization in which the magnetic flux density of the magnetization is close to a trapezoidal wave is needed to reduce torque ripple in a square wave drive brushless motor. However, because this need conflicts with reducing motor cogging torque, it is in reality difficult to reduce torque ripple. Furthermore, as a result of a degraded steering feel due to the effect of torque variation resulting from a shift in the commutation position (due to variation in the relative positions of magnetization and the coil, and the effect of position detection precision, as a result of such factors as armature reaction), and the effect of torque variations due to current variation during commutation, practical use of a high torque constant is difficult, and it is even more difficult to satisfy variation, position detection precision, current variation, and other requirements.

Furthermore, in the case of a sine wave drive brushless motor high resolution is required in the rotor position detector in order to reduce torque ripple, and to compensate for the effects of armature reaction in a motor with a high motor torque constant, position detector and CPU cost become high because of the advanced calculation capabilities and compensation data memory requirements.

The present invention was conceived with consideration for the above, and an object of the present invention is to provide a control apparatus for an electrical power steering apparatus comprised to achieve high output and a small size in the motor of the electrical power steering system, alleviate variation in the relative positions of magnetization and the coil, improve the steering feel (reduce the torque ripple feeling), and reduce apparatus cost.

DESCRIPTION OF THE INVENTION

The present invention relates to a control apparatus for an electrical power steering apparatus that controls a motor applying steering assistance force to the steering mechanism based on a current control value calculated from the motor current and a steering assistance command value calculated based on the steering torque produced on the steering shaft, and an object of the present invention is to restrain the torque ripple of the motor (a DC motor or brushless motor) within 10%. Moreover, even greater effectiveness can be achieved when the hysteresis width of the torque detecting means is 0.3 N·m or less, the response frequency is 20 Hz or less in cases, and the torque control frequency band of the control apparatus is 20 Hz or greater.

As a result, torque ripple factors in a DC motor or brushless motor of the electrical power steering system are analyzed, and torque ripple is reduced by manipulating means corresponding to these factors, in the present invention. Furthermore in the present invention, torque changes and torque variation in a square wave drive brushless motor are suppressed, and high frequency components that cannot be suppressed are absorbed by the damping effect of the torque transmission system. Low frequency components such as torque pulses are allowed to the level that they can be controlled by the torque control system, torque ripple is detected using a torque sensor with low hysteresis, and the effects thereof are suppressed by the control system. It is therefore possible to achieve a high output, small DC motor or brushless motor, and reduce torque ripple at low cost without sacrificing cogging torque.

BRIEF DESCRIPTION OF THE DRAWINGS

FIG. 16 is an exemplary waveform diagram of cogging torque;

FIG. 17 is an exemplary waveform diagram of torque pulse;

FIG. 18 is an exemplary waveform diagram of torque change;

FIG. 19 is an exemplary waveform diagram of torque variation;

BEST MODE FOR ACHIEVING THE INVENTION

A preferred embodiment of the present invention is described below with reference to the accompanying figures thereof.

The present invention can be applied to a dc motor with brushes or a brushless motor of a column type or pinion type electrical power steering system, and can also be applied to a DC motor with brushes or a brushless motor of a rack assistance type electrical power steering system.

Figure 1:
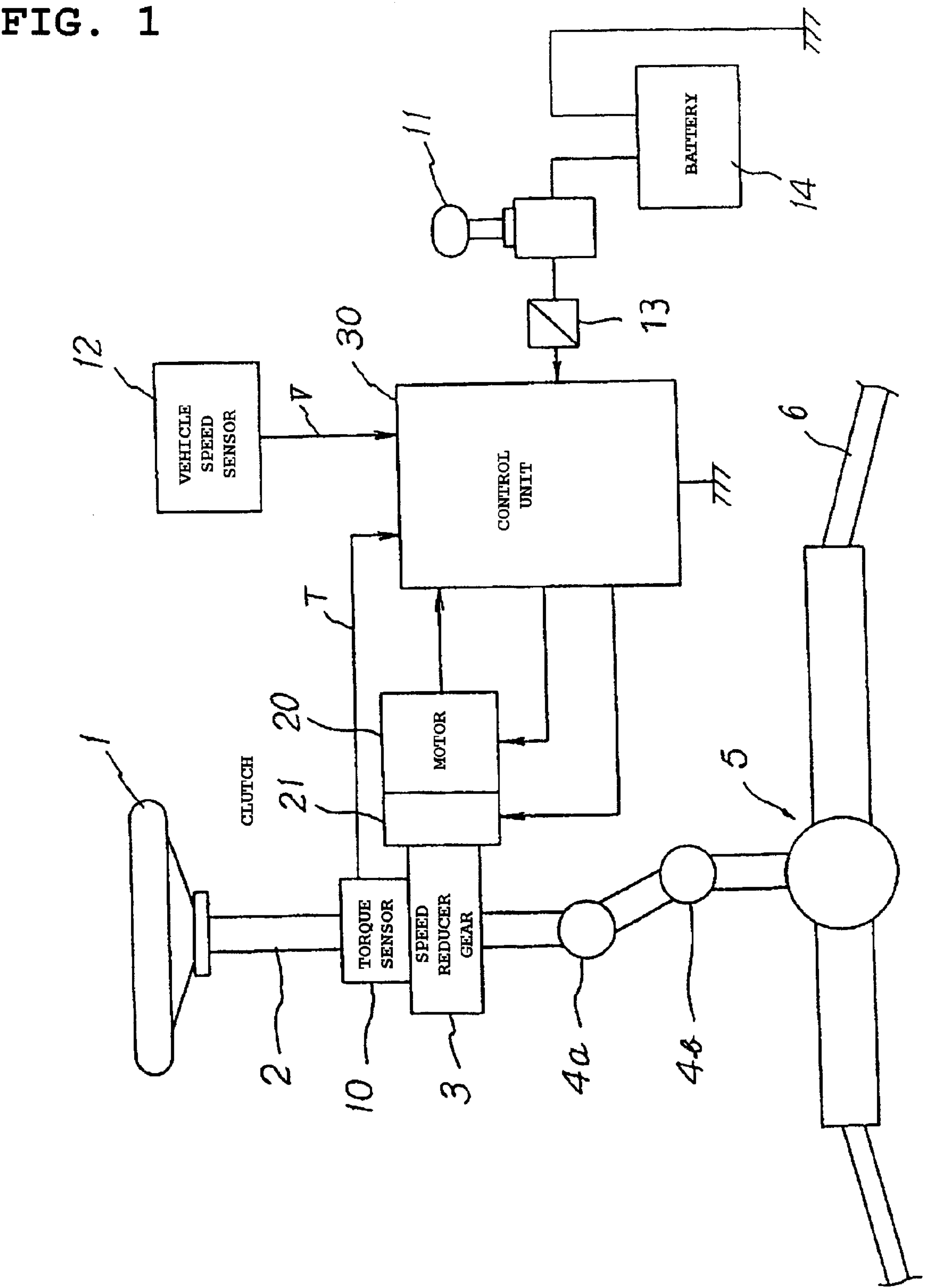
FIG. 1 is a block diagram of an exemplary electrical power steering system.
Figure 2:
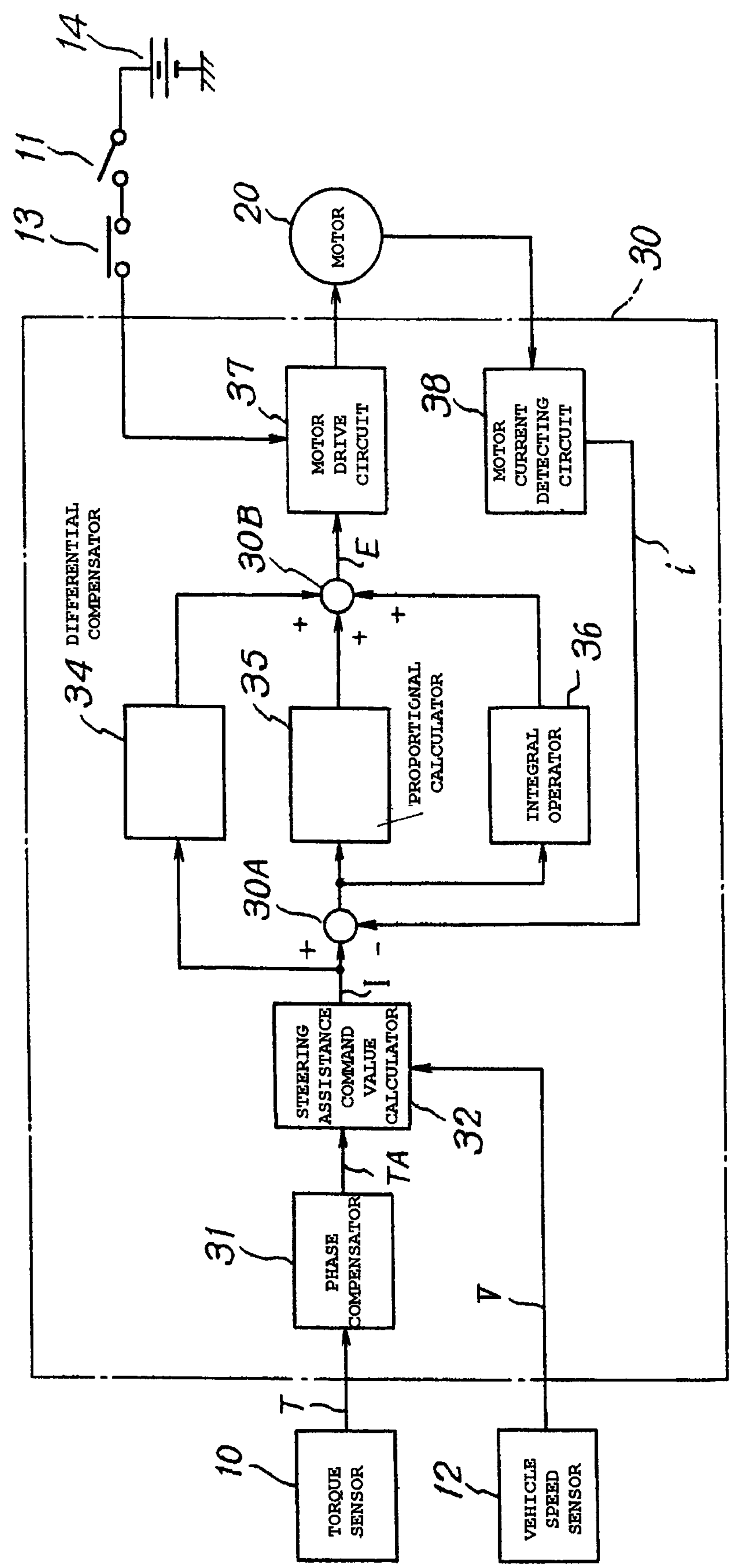
FIG. 2 is a block diagram showing the general internal configuration of a control unit.
Figure 3:
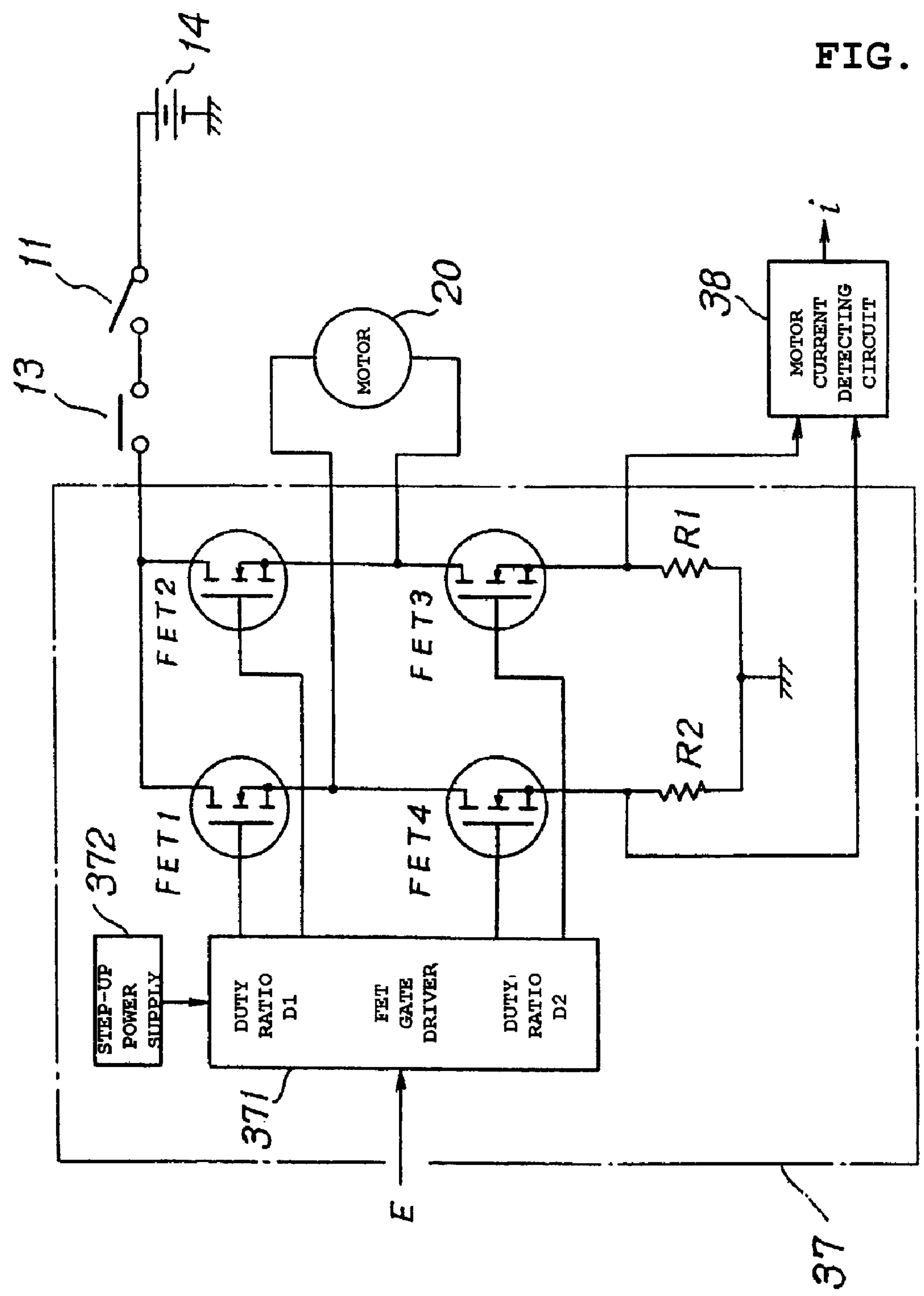
FIG. 3 is a wiring diagram of an exemplary motor drive circuit.
Figure 4:
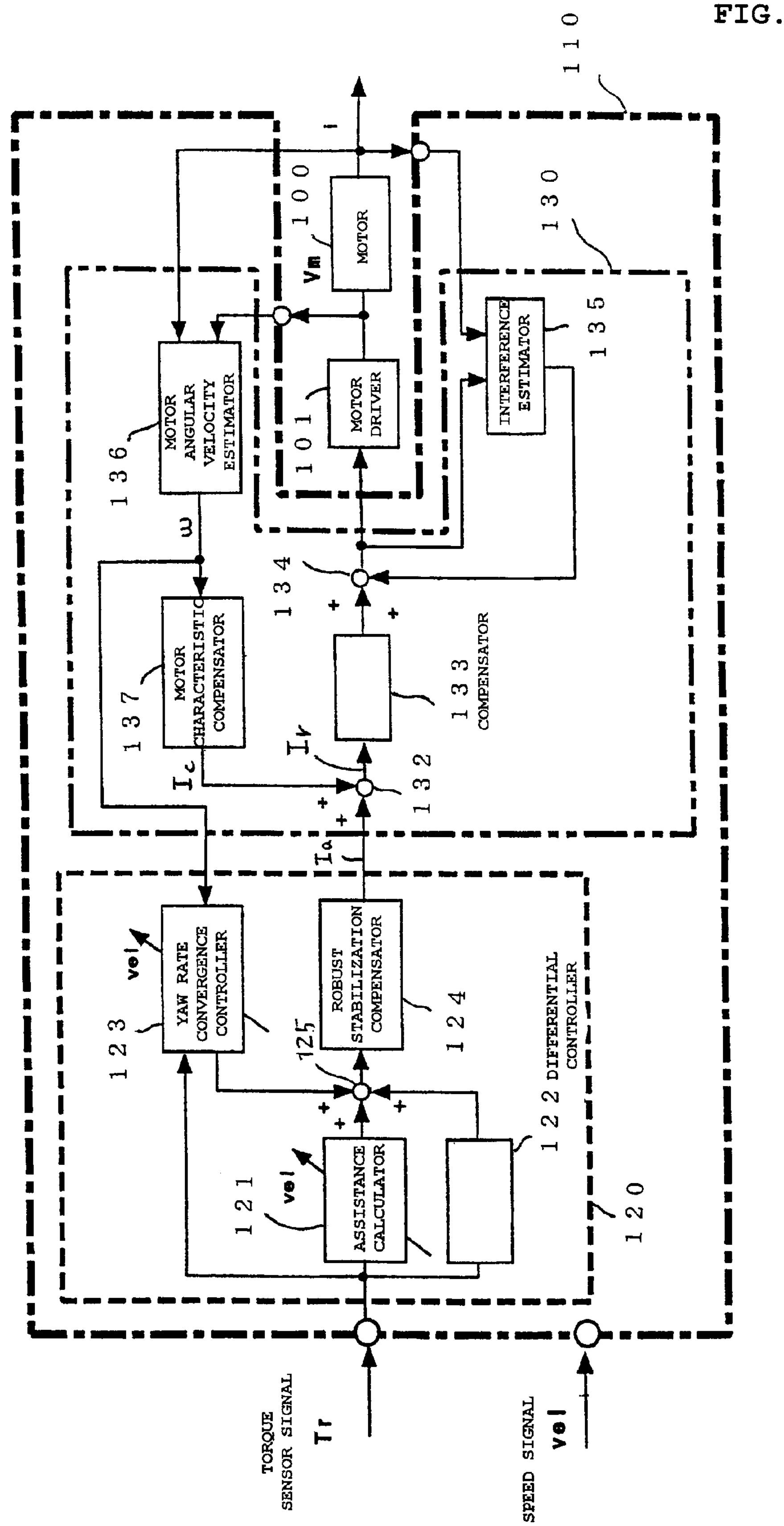
FIG. 4 is a block diagram showing an exemplary configuration of the present invention.

A DC motor with brushes is described first. The control system of the present invention is as shown in FIG. 4. That is, a motor 100 for steering assistance force of the steering system is driven by a motor driver 101, the motor driver 101 is controlled by a control unit 110, and torque sensor signal Tr from a torque sensor and speed signal vel from the vehicle speed detection system are inputted to the control unit 110. The control unit 110 comprises a torque system controller 120 for controlling using torque sensor signal Tr, and a motor controller 130 for control associated with the motor 100 drive; an assistance calculator 121, a differential controller 122, a yaw rate convergence controller 123, a robust stabilization compensator 124, and an adder 125 are disposed in the torque system controller 120. An adders 132 and 134, a compensator 133, an interference estimator 135, a motor angular velocity estimator 136, and a motor characteristic compensator 137 are provided in the motor controller 130.

Torque sensor signal Tr is inputted to the assistance calculator 121, the differential controller 122, and the yaw rate convergence controller 123, to each of which speed signal vel is also applied as a parameter. The assistance calculator 121 calculates the assistance torque based on the torque sensor signal Tr; the yaw rate convergence controller 123, to which the torque sensor signal Tr and angular velocity w from the motor angular velocity estimator 136 are inputted, applies the brakes with respect to how the steering wheel is turned to improve the convergence of vehicle yaw; and the differential controller 122 improves control response near the neutral steering position to achieve smooth steering. Outputs from the assistance calculator 121, the differential controller 122, and the yaw rate convergence controller 123 are inputted to the adder 125, the sum obtained by which is inputted to the robust stabilization compensator 124 as the assistance level. The robust stabilization compensator 124 is a compensator as taught in Japanese Patent Application Laid-open (KOKAI) No.8-290778, has a characteristic equation $G(s)=(S^2+a1\cdot s+a2)/(S^2+b1\cdot s+b2)$ where s is a Laplacian operator, removes the peak value from the resonance frequency of the resonance system consisting of spring elements and inertial elements contained in the detection torque, and compensates for phase offset in the resonance frequency interfering with the stability and response of the control system. It should be noted that parameters a1, a2, b1 and b2 of the characteristic equation G(s) are determined according to the resonance frequency of the resonance system.

Furthermore, the motor angular velocity estimator 136 estimates motor angular velocity w based on motor terminal voltage Vm and motor current i, and the motor angular velocity w is inputted to the motor characteristic compensator 137 and the yaw rate convergence controller 123. Output Ic of the motor characteristic compensator 137 and output Ia of the robust stabilization compensator 124 are added (Ir) by the adder 132 and inputted to the compensator 133, which is, for example, a differential compensator, and the current control value compensated by the compensator 133 is inputted by way of intervening the adder 134 to the motor driver 101 and the interference estimator 135. The interference estimator 135 is a device such as taught in Japanese Patent Application Laid-open (KOKAI) No.8-310417, comprised to calculate for feedback control a difference to the desired motor control characteristic in the output standard of the control system based on the motor current i and current control value from the adder 134, which is the motor output control target; as a result, a desired motor control characteristic can be maintained even if the motor terminal resistance, motor torque constant, or other characteristic constant varies so that the stability of the control system is not lost.

Figure 5:
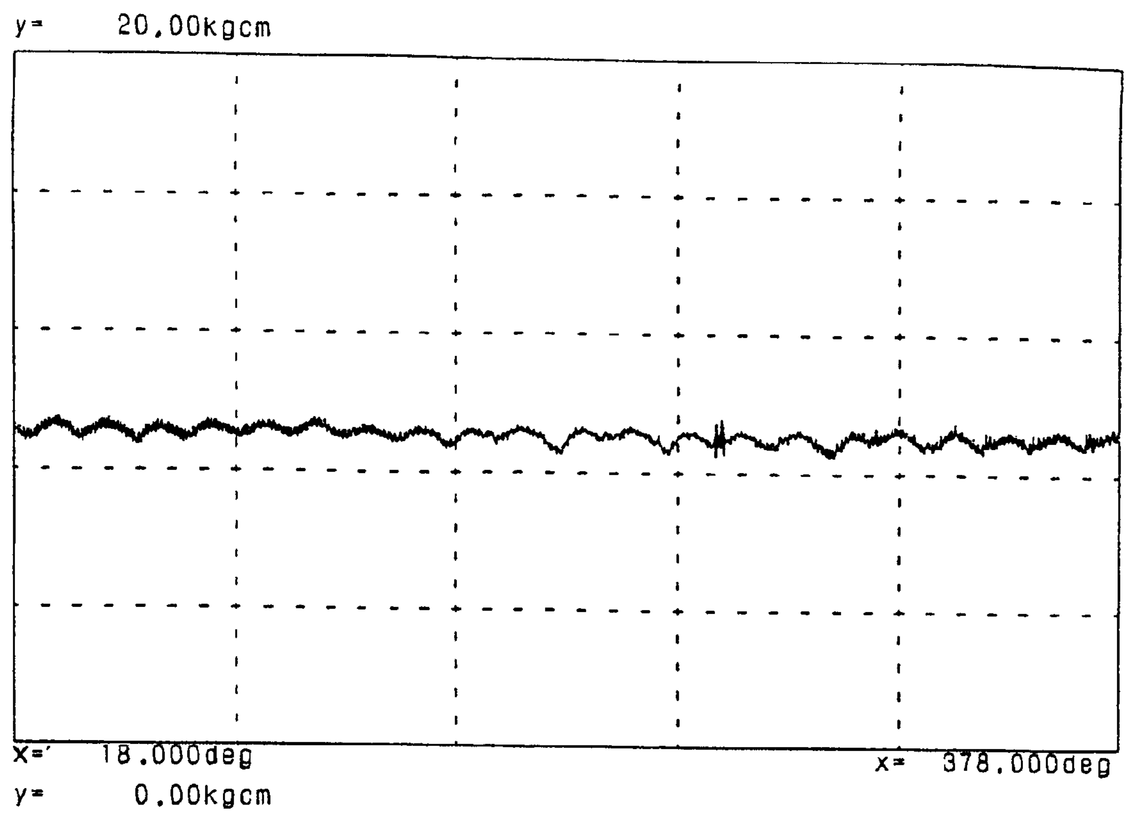
FIG. 5 is a graph of the output torque characteristic of a DC motor with brushes.
Figure 6:
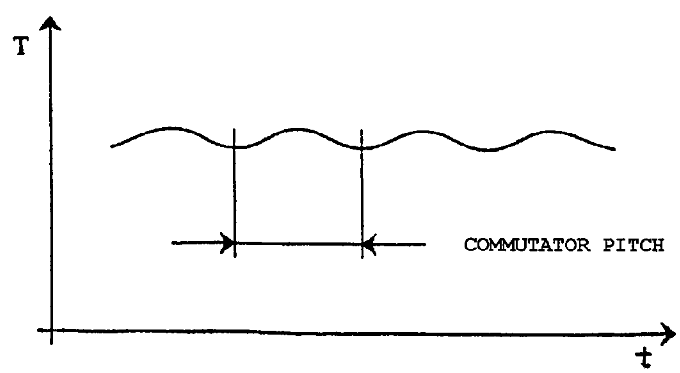
FIG. 6 is a graph of magnetic flux variation (magnetic resistance variation) contained in the output torque characteristic of a DC motor with brushes.
Figure 7:
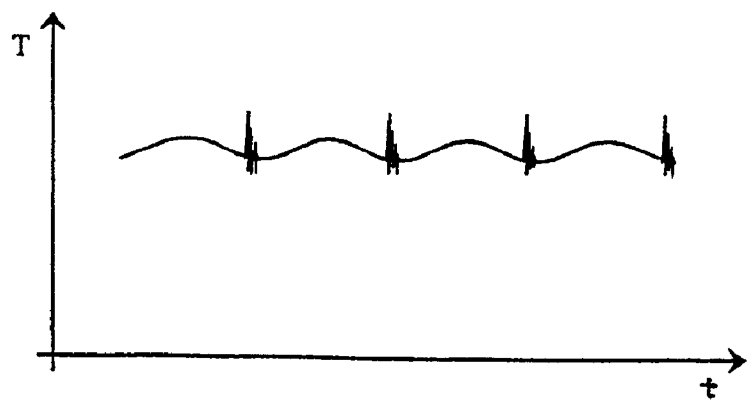
FIG. 7 is a graph of commutation shift contained in the output torque characteristic of a DC motor with brushes.
Figure 8:
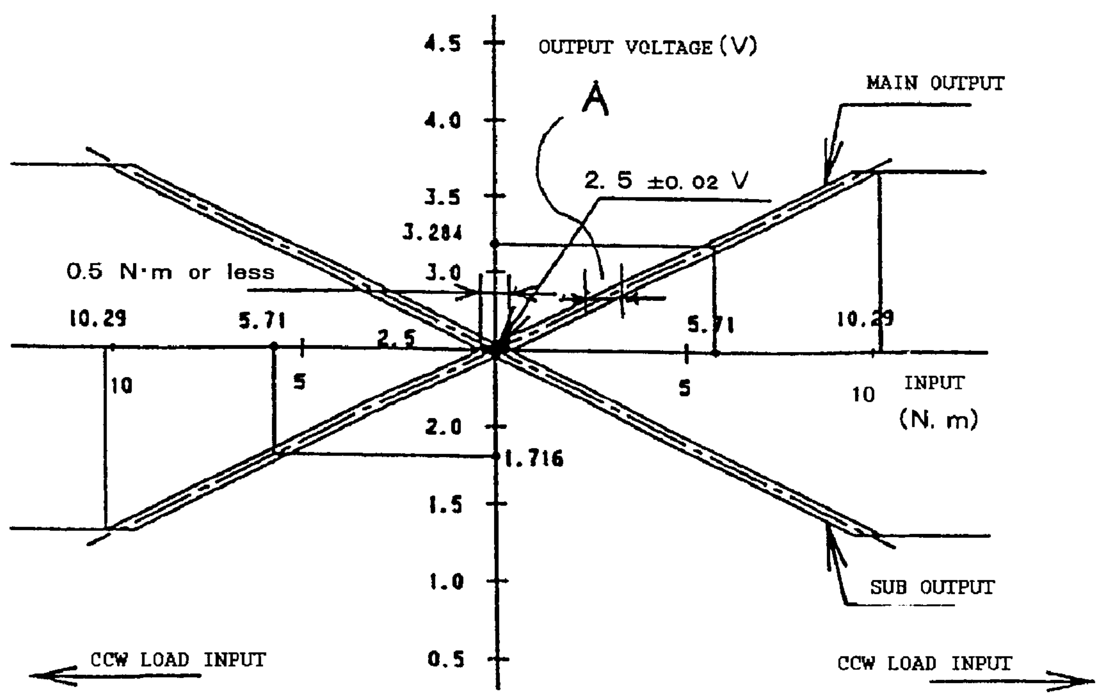
FIG. 8 is a graph of an exemplary torque sensor characteristic.

The torque ripple produced by the motor (DC motor with brushes) typically has a great nonlinear characteristic such as shown in FIG. 5. The torque ripple shown in FIG. 5 can be broadly categorized as torque ripple resulting from flux variations (change in magnetic resistance) such as shown in FIG. 6, and torque ripple resulting from commutation disturbance such as shown in FIG. 7. In the case of flux variation, there is a sine wave shaped nonlinear relationship between current flowing through a particular coil and torque ripple occurring at that time, and control is possible in some cases. That is, if the motor torque ripple can be detected by a torque sensor, there will be a torque ripple range in which correction is possible by means of torque control. On the other hand, the commutation operation itself is a type of switching operation, and accurate control is difficult in the case of torque ripple due to commutation disturbances. The present invention focuses on this point, and enables torque necessary by maximally reducing torque ripple occurring as a result of commutation disturbance, allowing torque ripple occurring due to flux variation up to the level that it can be controlled (within 10%), detecting torque ripple using a torque sensor with little hysteresis such as shown in FIG. 8 A (maximum 0.3 N·m), and correcting the effects thereof in the control system. Furthermore, by setting the frequency band of the control system to at least 20 Hz or greater in the case of torque ripple due to flux variation, a smooth steering feel can be achieved because it is difficult for a person to feel torque ripple of 30 Hz or greater.

Factors contributing to torque ripple include the effective magnet angle, skew precision, changes in magnetic resistance due to the gap, advancement angle offsets due to the relative positions of the commutator and magnet, and commutation disturbances due, for example, to the commutator, brushes, precision, or materials. Because commutation disturbance cannot be corrected in the control system, torque ripple is brought as close as possible to zero (for example, 1% or less) by means of motor design technology. Magnetic resistance variations and advancement angle offsets can be controlled in the control system insofar as torque sensor hysteresis is 0.3 N·m or less, and torque ripple problems do not occur if magnetic resistance variation and advancement angle offset combined are 10% or less.

An embodiment of the present invention is described in detail next below.

A driver can feel through the steering wheel changes in torque of 0.3 N·m or greater up to a frequency of approximately 30 Hz or less. An object of the present invention is to prevent the torque ripple from occurring by setting the following conditions. In addition, the torque ripple occurring from commutation is reduced as much as possible within the motor design. Problems of commutation disturbance are primarily design related problems associated with the brushes and commutator, and can be addressed by such measures as forming an oxidation film on the commutator surface to consume arc current during minor steering by destroying the oxidation film. On the other hand, when the torque ripple occurring as a result of flux variation is corrected in the control system, the torque constant (produced torque/current) must be set higher than in the design of a conventional device. That is, by setting a wide center angle for the magnet, a small skew angle can be used, flux density can be increased by making the air gap small, and a high motor torque constant can be achieved. A particular torque constant can therefore be achieved using a shorter motor rotor and magnet compared with a conventional design. This means that the coil length can also be shortened and output increased. In other words, output can be increased while also downsizing the motor.

Next, a method for controlling torque ripple occurring as a result of flux variation is described. The relationship between a particular coil and torque ripple is nonlinear, but control is possible within the motor design. This can be achieved by adjusting the commutation timing to the electric angle and thereby achieving a sine wave shaped torque ripple waveform. Therefore, insofar as nonlinearity is not extremely great, control is possible if the torque ripple is detectable by a torque sensor (torque detection means). To detect and control torque ripple, it is necessary to set torque sensor detection hysteresis to the target torque ripple level or below. Tests demonstrated that the driver does not feel steering is smooth if torque ripple is 0.4 N·m or greater at the steering shaft. As a result, torque sensor detection hysteresis must be set to 0.3 N·m or less.

Figure 9:
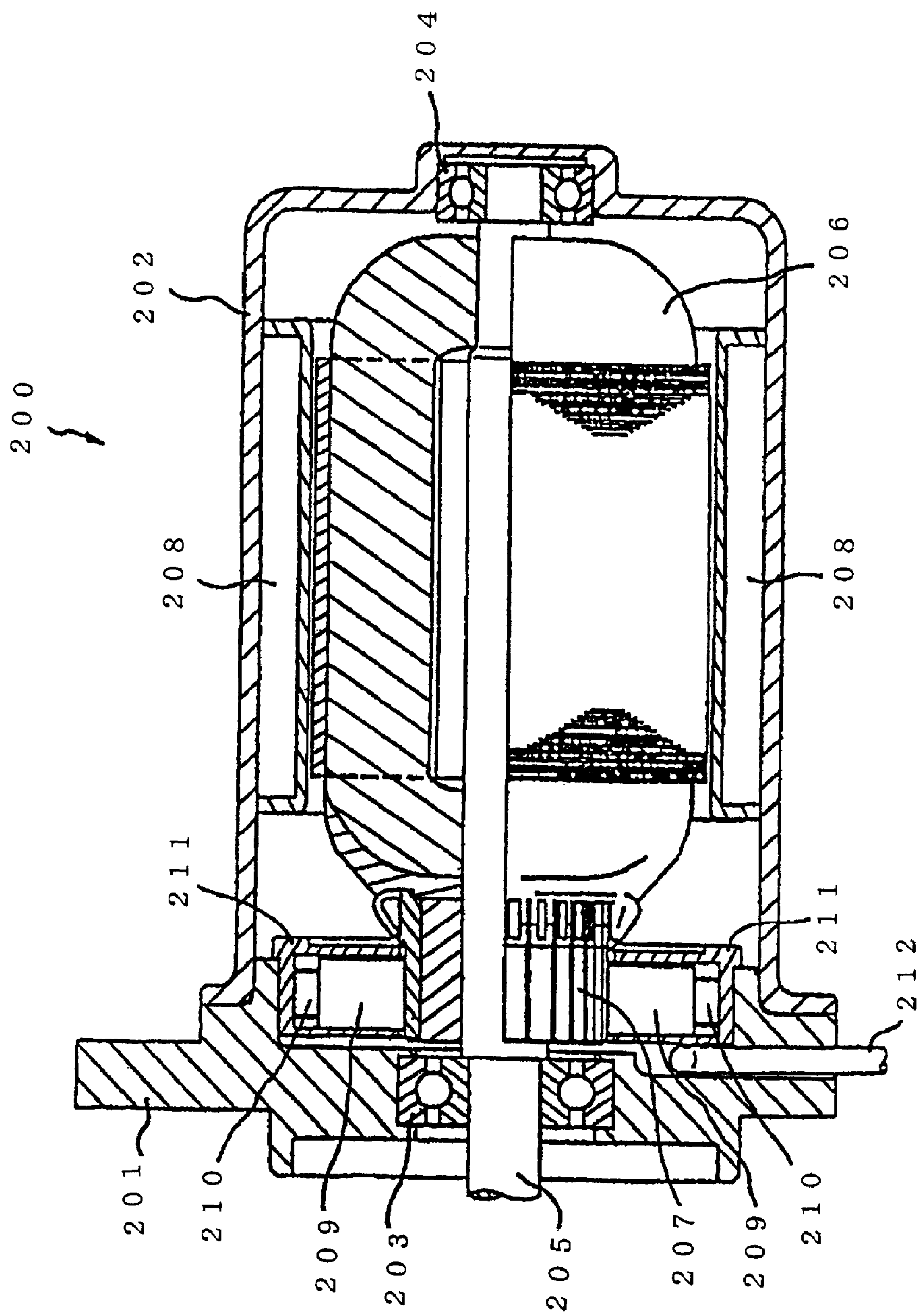
FIG. 9 is a longitudinal section view of an exemplary DC motor with brushes.

To suppress commutation noise in a DC motor with brushes, the internal resistance thereof is set to 0.15Ω or less. FIG. 9 is a longitudinal section of the DC motor 200 wherein 201 is a bracket, 202 is the frame, and output shaft 205 is supported freely rotatably on the bracket 201 and the frame 202 by means of intervening front and back ball bearings 203 and 204. An armature 206 (rotating member) having an armature core and coil is externally fit and affixed on the frame 202 side of the output shaft 205. Magnetic field permanent magnet 208 is fixed to the inside surface of the frame 202 surrounding the armature 206, and a brush 209 for slide contacting commutator 207, and brush spring 210 for pressing brush 209 to commutator 207, are held on the bracket 201. Reference number 211 is a brush holder, and 212 is a power supply line from a controller not shown in the figures.

Figure 10:
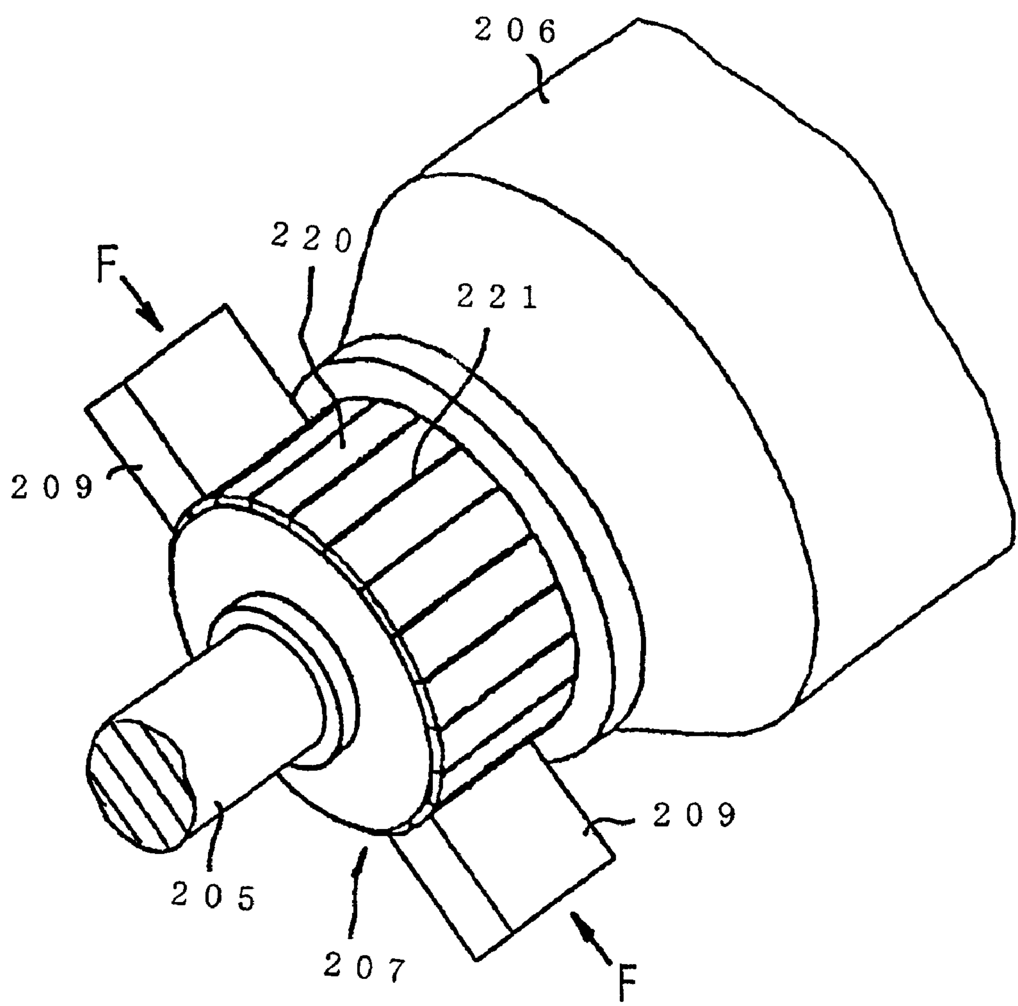
FIG. 10 is an oblique view showing the commutator-brush contact area.
Figure 11:
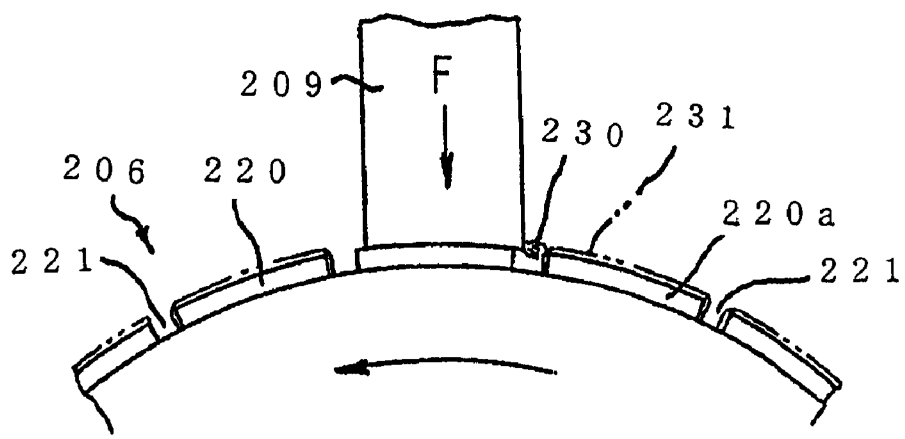
FIG. 11 describes commutator and brush action.

As shown in an oblique view in FIG. 10, the commutator 207 has plural pure copper segments 220 arranged in a fan pattern and encased in resin; a slit 221 of a specific width is formed between each of the segments 220. The brushes 209 are so-called metal-graphite brushes of primarily copper and carbon, and are pressed perpendicularly to the outside surface of the commutator 207. A coil spring or other constant tension spring is used for the brush spring 210 in order to maintain a constant pressure F regardless of the brush 209 wear. The carbon content of the brush 209 is 40%, and pressure F urging the brush 209 to the commutator 207 is set at 160 gf. When drive current is outputted to the DC motor 200 by a controller and the commutator 207 turns left in conjunction with rotation of the armature 206, the contact end of the brush 209 separates from right side segment **220*a* as shown in FIG. 11, and at that instant arc current 230 occurs between the brush 209 and the segment 220*a*. However, because the oxidation film 231 is formed on the surface of the segments 220 in the present invention, the greater part of the arc current 230 is consumed by destroying this oxidation film 231, and substantially no arc attraction occurs between the brush 209 and the segments 220. As a result, current oscillation becomes small because the commutator 207** alternately ceases rotating on a small cycle, and vibration in the middle steering shaft and upper steering shaft, as well as abnormal noise in the speed reducer and vibration in the steering wheel, are suppressed to a level at which they can be ignored.

Figure 12:
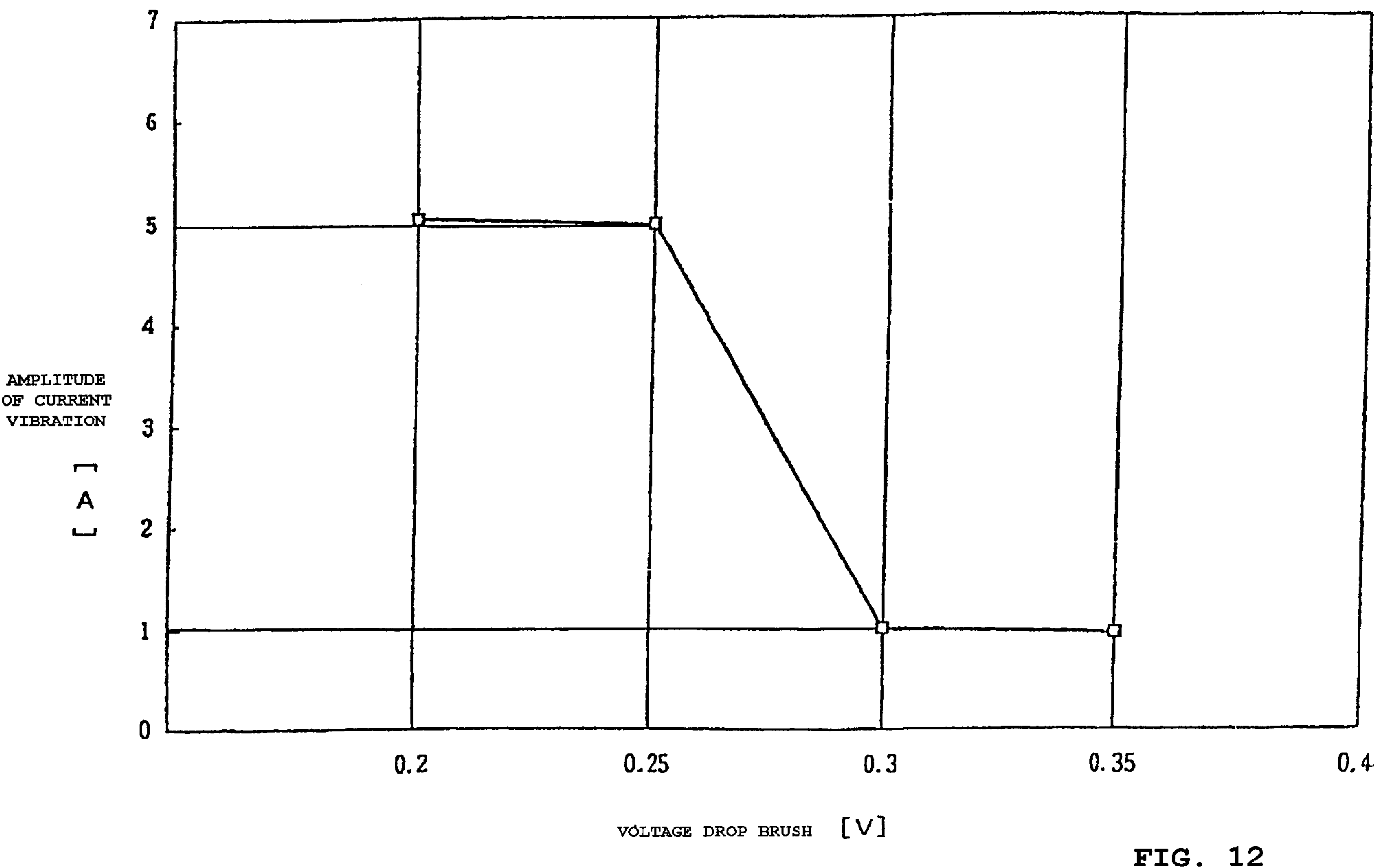
FIG. 12 is a graph showing the relationship between voltage drop and current oscillation.
Figure 13:
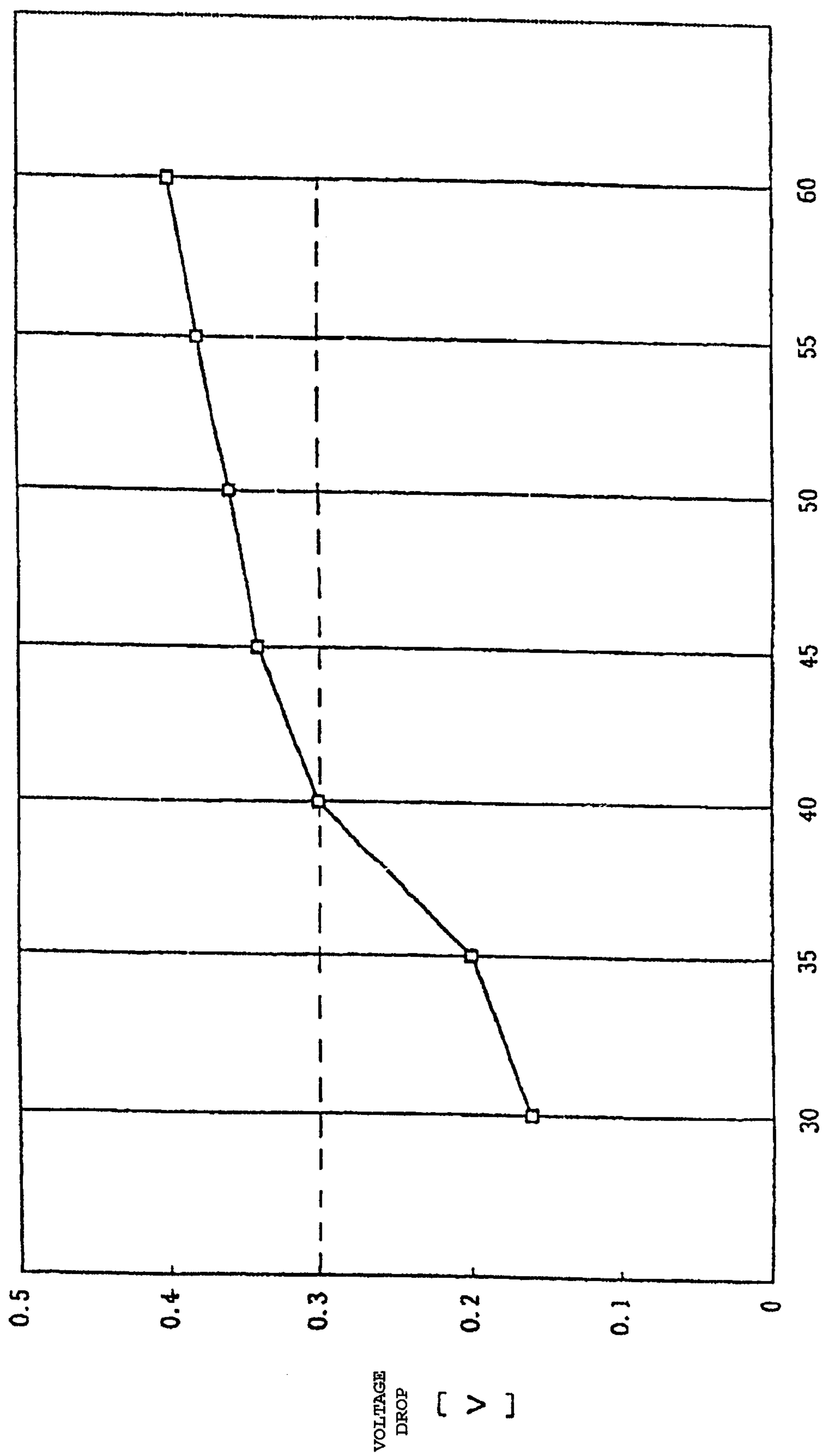
FIG. 13 is a graph showing the relationship between brush carbon content and voltage drop.
Figure 14:
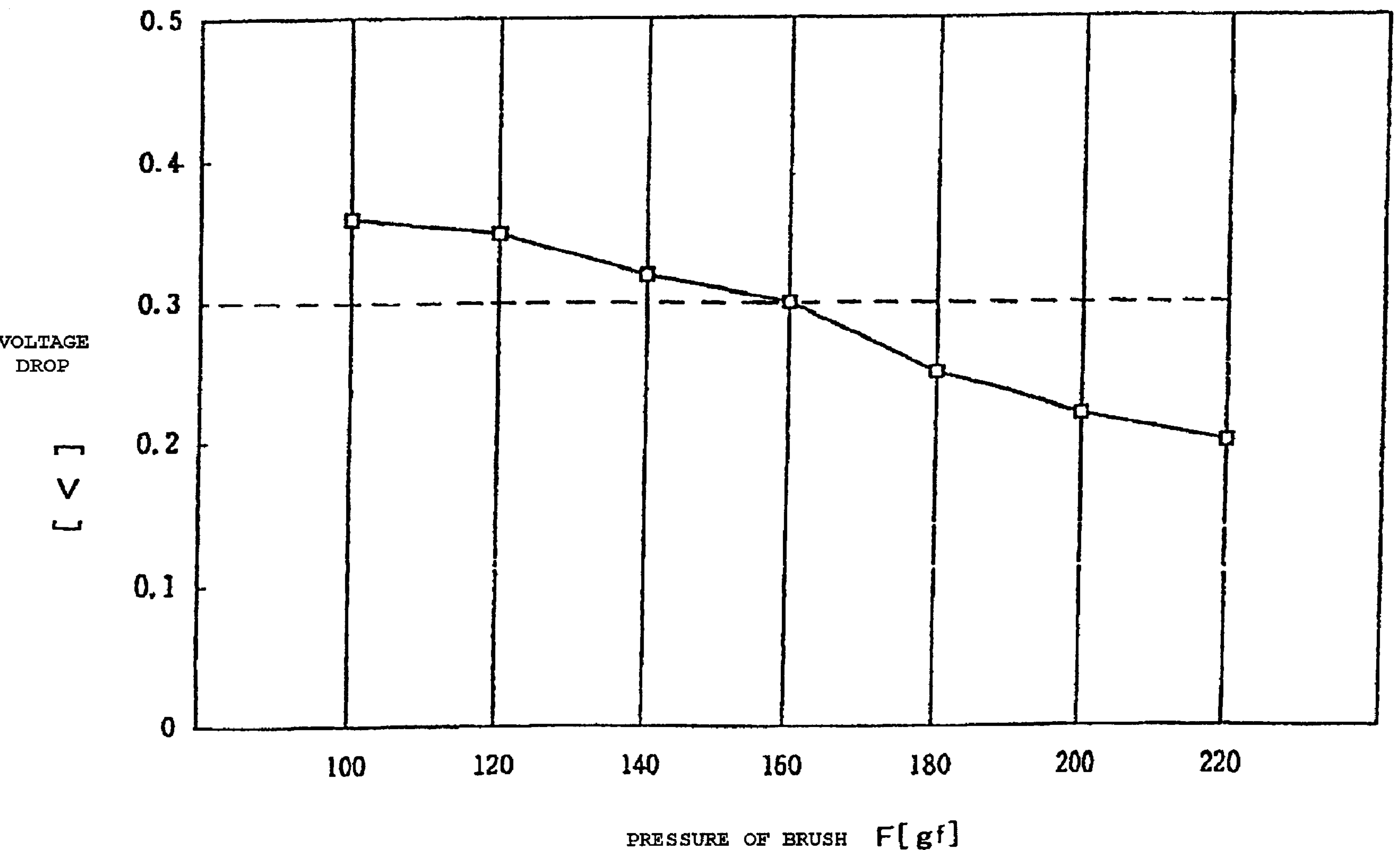
FIG. 14 is a graph showing the relationship between brush-commutator pressure F and voltage drop.

The following results were obtained by variously changing the carbon content of the brush 209 and the pressure F of the brush 209 against the commutator 207. First, regarding the relationship between current oscillation and a voltage drop in the brush 209, the amplitude of current vibration is approximately 1 A if the voltage drop is 0.3 V or greater as shown in FIG. 12, and there is a significant drop in the DC motor 200 torque variation causing steering shaft vibration. Next, when the carbon content of the brush 209 was increased or decreased in 5% increments to achieve a voltage drop of 0.3 V or greater, this voltage drop was achieved at a 40% carbon content as shown in FIG. 13. It should be noted that wear is accelerated when an oxidation film 231 is formed on the surface of segments 220, and it is therefore not desirable to increase the carbon content. Furthermore, when the pressure F was increased and decreased in 20 gf increments to achieve a voltage drop of 0.3 V or greater, this voltage drop was achieved at 160 gf as shown in FIG. 14.

Moreover, the torque ripple by nature occurs at the frequency equal to motor speed times slot count. It is also known from tests that the torque ripple is easily noticed by the driver at a frequency from 5 Hz to 30 Hz. It is therefore important to set the control gain high from approximately 5 Hz to 30 Hz to suppress the torque ripple.

The control system of the present invention shown in FIG. 4 that satisfies the above frequency band specification without affecting other performance is described below. An example in which this is accomplished using the robust stabilization compensator 124 and a phase advance compensator (compensator 133) is shown here. To simplify the description, assistance gain is simple gain K, and the closed characteristic of the controller and mechanical system is approximately the characteristic of the following equation (1). In the equation (1) s is a Laplacian operator, and a1, a2, b1 and b2 are parameters determined by the resonance frequency of the resonance system.

$$G_{op}^{(S)} = \frac{(s+a1)b3}{(s+a2)(s^2+b1\cdot s+b2)}\cdot K \tag{1}$$

where the second degree equation of the denominator of the equation (1) is the characteristic of the mechanical system compensated by the robust stabilization compensator 124 after first compensating for friction and inertia in the motor 100, and the remaining first degree items of the remaining numerator and denominator are phase advancement compensation. The closed property of the equation (1) is the equation (2). In the equation (2) c0, c1 and c2 are parameters determined by the resonance frequency of the resonance system.

$$G_{op}^{(S)} = \frac{(s+a1)b3}{s^3+c0\cdot s^2+c1\cdot s+c2}\cdot K \tag{2}$$

where c0 c1 and c2 are items obtained by expanding (s+a2)×($S^2$+b1·s+b2)+(s+a1)b3·K.

The closed characteristic that is targeted is determined as follows to obtain response between 5 Hz and 30 Hz. In the equation (3) d0, d1, d2 and d3 are parameters determined by the resonance frequency of the resonance system.

$$G_{op}^{(S)} = \frac{(s+d3)b3}{(s+d0)(s^2+b1\cdot s+b2)}\cdot K \tag{3}$$

The desired response characteristic is obtained when the equation (2) and the equation (3) match. It is therefore enough if c0, c1 and c2 match the expansion of (s+d0)×($S^2$ +d1·s+d2). The parameter d3 is determined by a numerator matching condition, and it is therefore enough to set parameters d0, d1 and d2 to match the conditions. These parameters d0, d1 and d2 can be obtained by substitutionally solving the simultaneous equations in the equation (4).

$$s1=d3$$
$$c0=d1+d0$$
$$c1=d2+d0\cdot d1$$
$$c3=d0\cdot d2 \tag{4}$$

In actuality, gain K varies according to a function of the torque and vehicle speed, and the above parameter settings must be determined with consideration for variation in the gain K. The above-noted band tuning is not the only method available, and the solution can be obtained as a design problem of H-infinite control, or using third order or greater phase advancement/delay compensation. While the constant gain is determined by the assistance characteristic gain when the band characteristic is as shown in the equation (3), interference torque is suppressed in a specific bandwidth (5 Hz to 30 Hz in the present embodiment) regardless of the assistance characteristic gain, and it is possible to compensate for torque ripple in this band.

The present invention is described next below with reference to a brushless motor. It should be noted that this embodiment is described using square wave drive, but it can be likewise applied with sine wave control.

Figure 15:
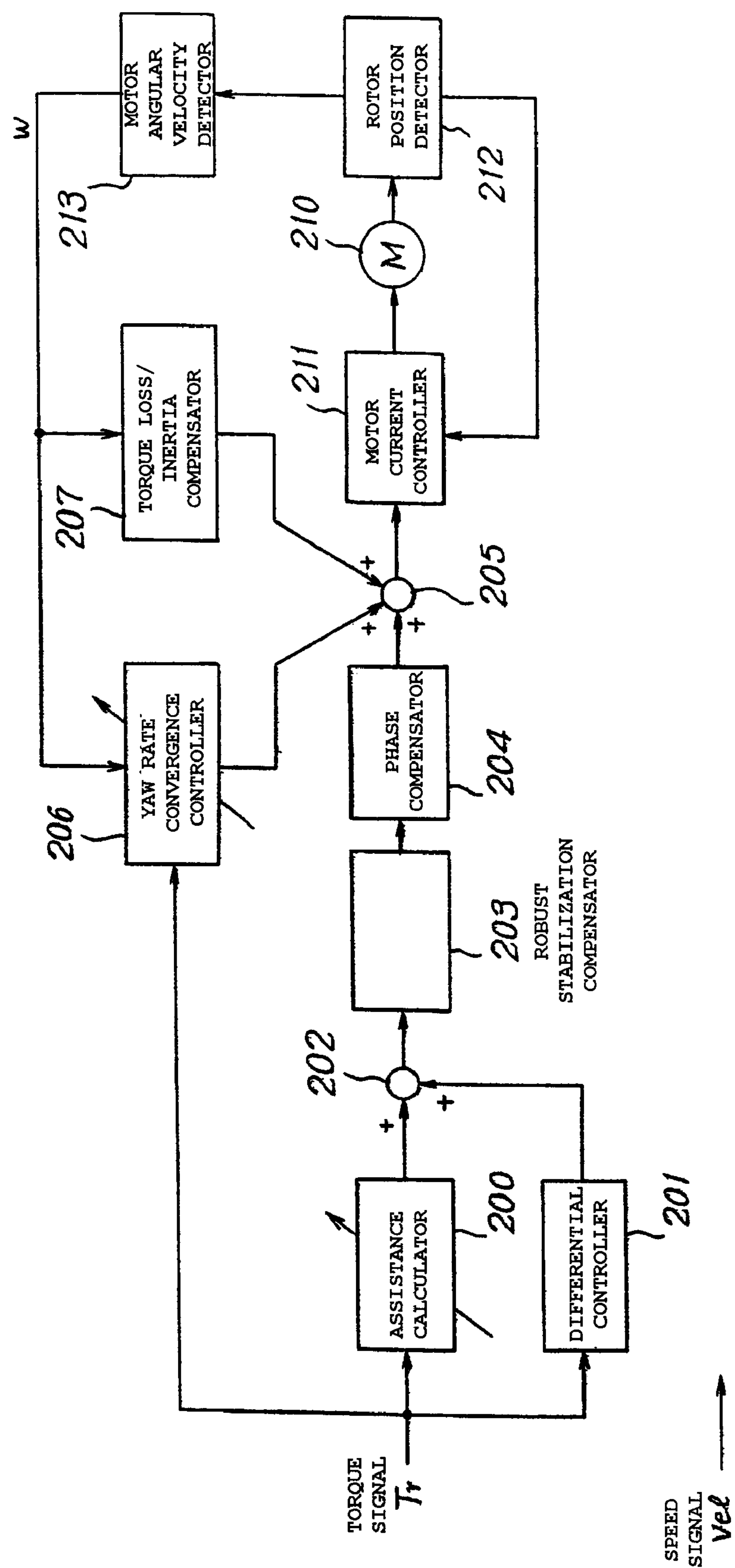
FIG. 15 is a block diagram showing another embodiment of the present invention.

As shown in FIG. 15, the present invention comprises in this case a torque system control section using torque signal Tr, and a brushless motor current control section. A motor angular velocity detector 213 is obtained from the rotor position detection signal of the brushless motor 210, and is a device such as taught in Japanese Patent Application No. 10-232031. The position detection signal is a signal obtained by a low resolution or high resolution magnetic, solenoid, optical, or other type of a rotor position detector 212, which is, for example, a Hall IC, absolute resolver or encoder.

A robust stabilization compensator 203 is a compensator as taught in Japanese Patent Application Laid-open (KOKAI) No.8-290778, has a transfer function $G(s)=(S^2+a1\cdot s+a2)/(S^2+b1\cdot s+b2)$, removes the peak value from the resonance frequency of the resonance system consisting of spring elements and inertial elements contained in the torque detection system, and compensates for phase offset in the resonance frequency interfering with the stability and response of the control system. Motor angular velocity w from the motor angular velocity detector 213 is inputted to a yaw rate convergence controller 206 and a torque loss/inertia compensator 207, and the outputs thereof are added by an adder 205.

Figures 16, 17, 18, 19:
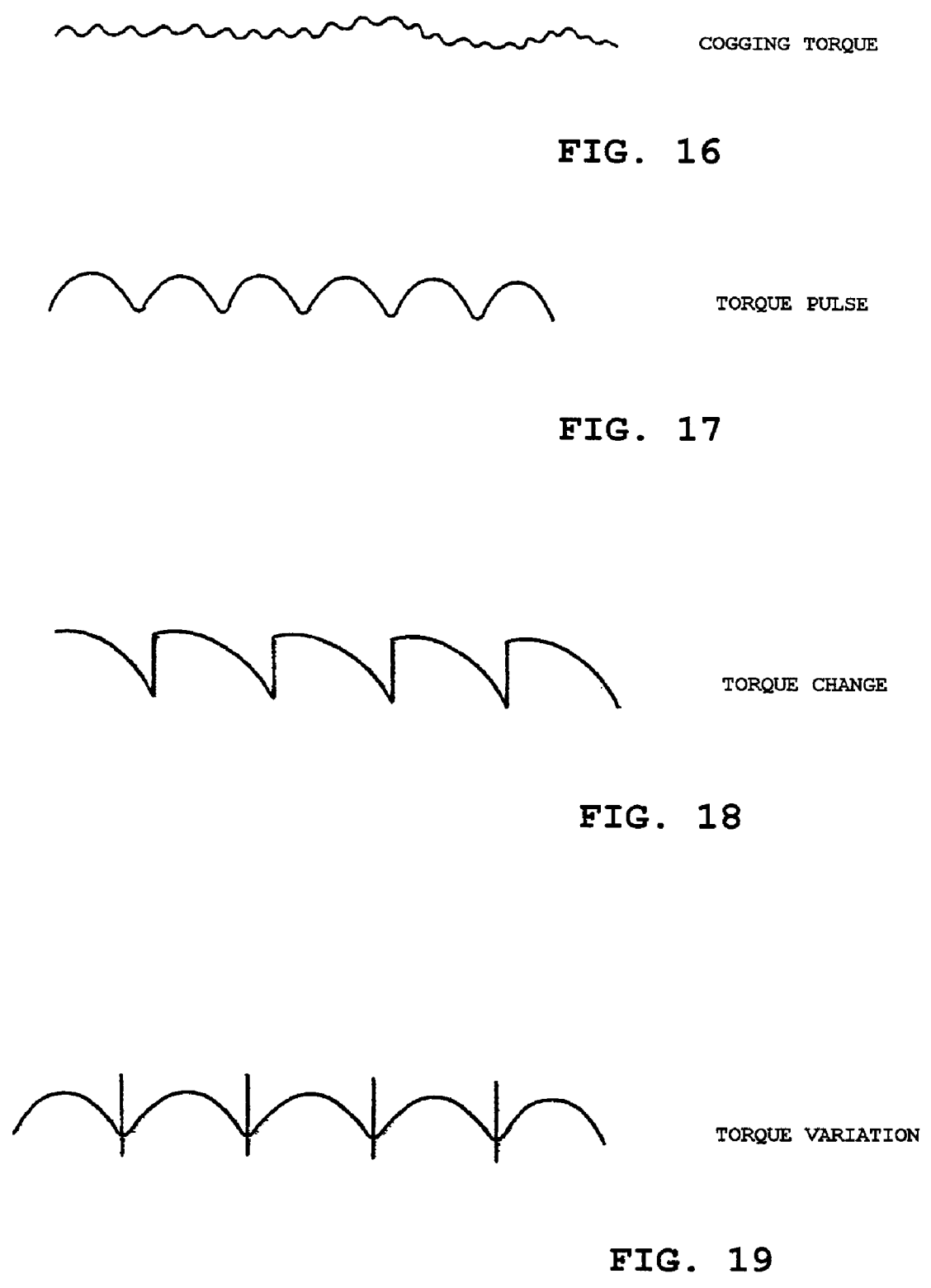
Figure 20:
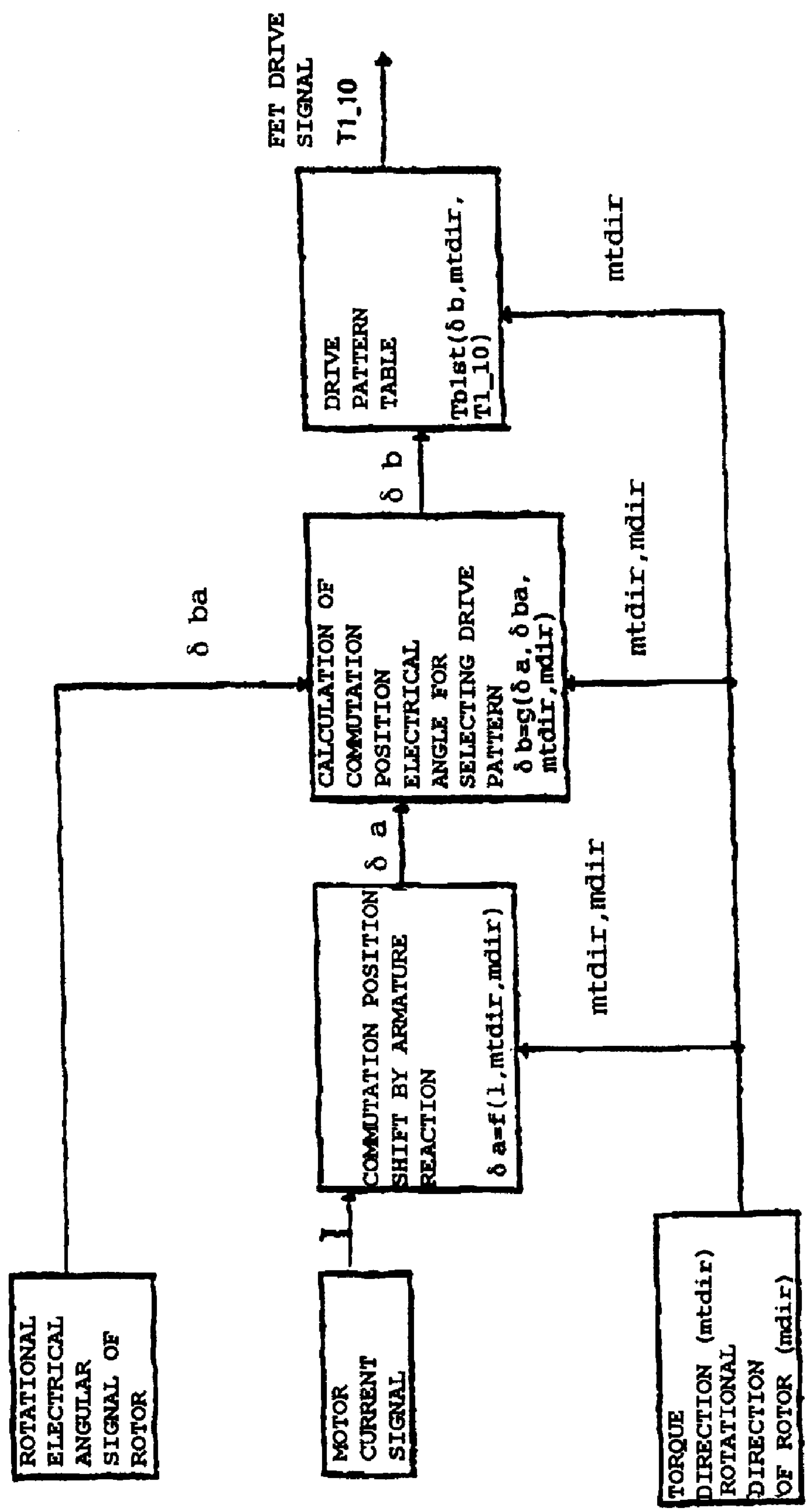
FIG. 20 is a block diagram of an exemplary circuit for compensating commutation position shift.

The torque ripple produced by the brushless motor 210 can normally be categorized in the four types as shown in FIG. 16 to FIG. 19. That is, FIG. 16 shows cogging torque, FIG. 17 shows torque pulse, FIG. 18 shows torque change and FIG. 19 shows torque variation. Torque change occurs when the commutation position shifts during square wave drive commutation. To suppress change due to a commutation position shift caused by armature reaction, the present embodiment compensates for commutation position shift using a value indicating the effect of armature reaction, and the four motor operation states using the rotation angle signal of the rotor, as shown in FIG. 20. This is described in detail in Japanese Patent Application No.11-8888. Torque change resulting from the effects of variation in the relative positions of magnetization and the armature coil, and the precision of the position detection signal, are suppressed by improving magnetization precision and location detection precision.

Figure 21:
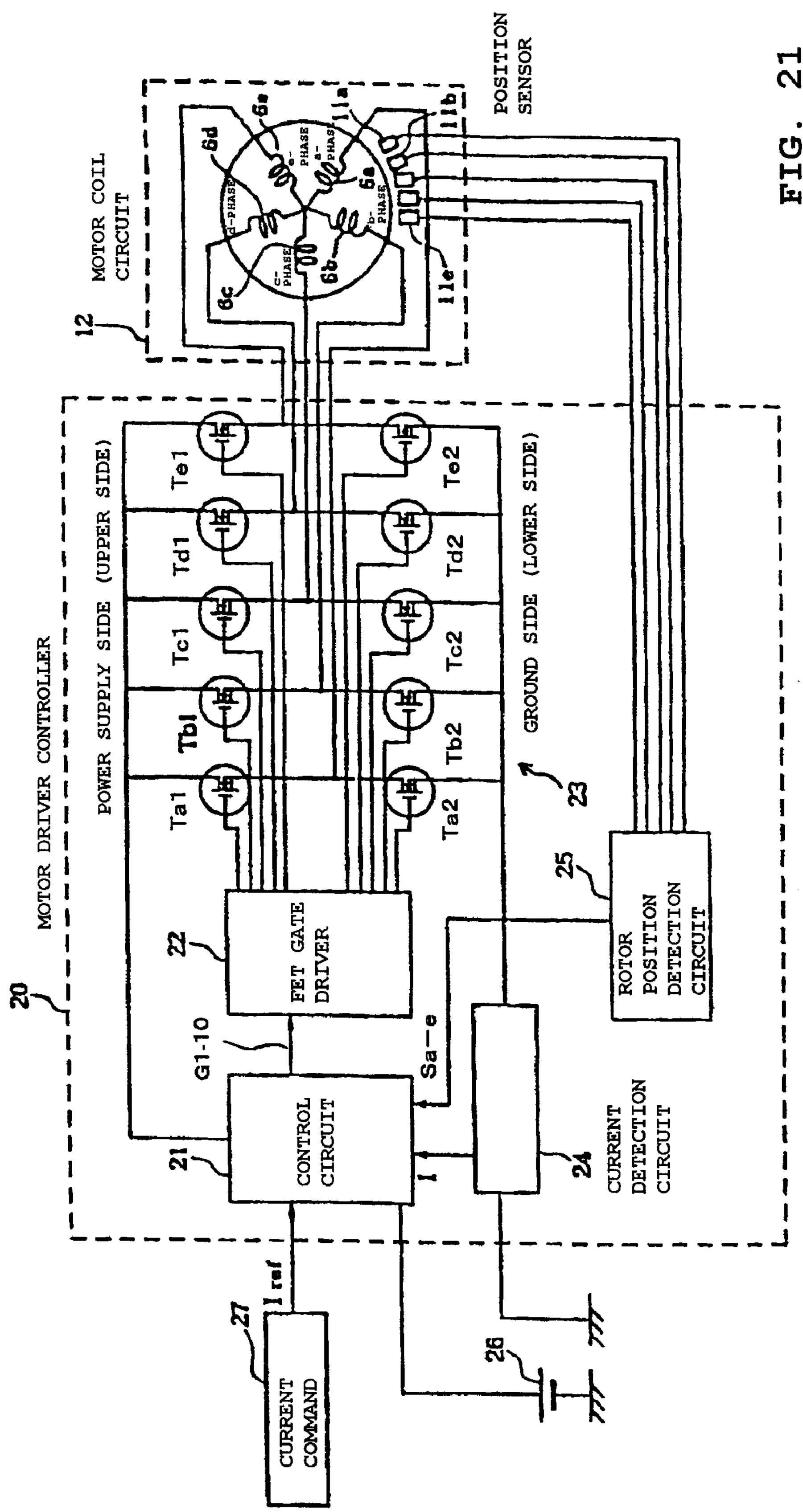
FIG. 21 is a block diagram of an exemplary circuit for reducing torque variation.
Figure 22:
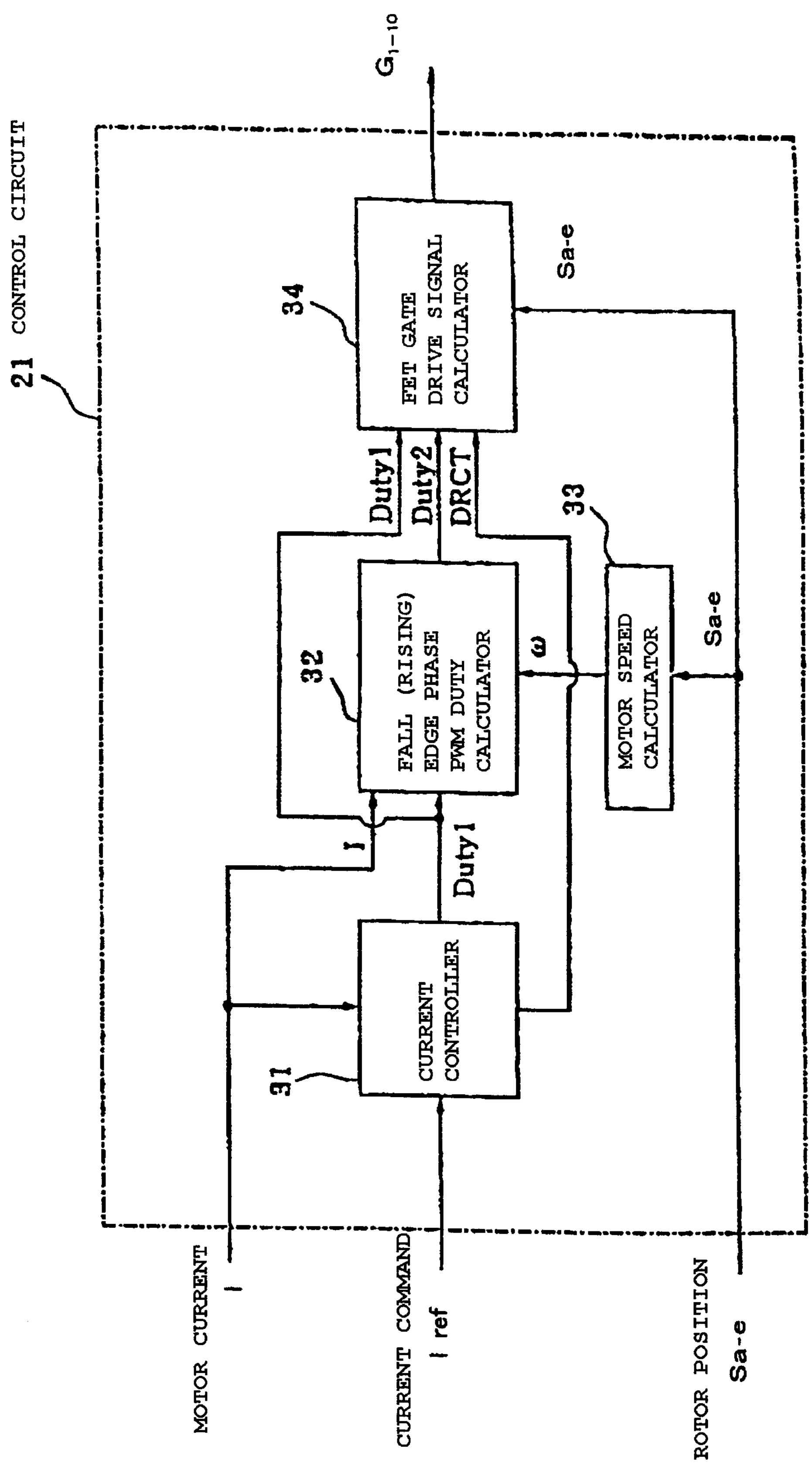
FIG. 22 is a block diagram of an exemplary circuit for reducing torque variation.

Because the rate of change in the commutation current during square wave drive commutation does not match, variation occurs in the motor current, and this current variation produces torque variation. As shown in FIG. 21 and FIG. 22, to suppress torque variation during commutation in the present invention, PWM duty is controlled during commutation to make the rate of current change during commutation match, thus reducing current variation and suppressing torque variation. With this method torque variation due to the current variation can be reduced using a single current sensor. The details of this are described in Japanese Patent Application No.10-160641.

Torque pulsation results primarily from the condition of magnetization, and the degree of magnetization or coil skew, and it is very difficult to balance torque pulsation and cogging torque. The steering feeling near the center is particularly degraded near the center steering position if the cogging torque is increased in electrical steering because the assistance force is low near the center steering position. While the cogging torque can be reduced by such measures as approximately sine wave magnetization and skewing control, this conversely increases the torque pulsation. Approximately 12% torque pulsation occurs with a three-phase motor. The cogging torque can be made small with a segmented core, but to significantly reduce the torque pulsation square wave magnetization of approximately 120 degrees is necessary. Such magnetization is, however, difficult to achieve in practice. Furthermore, in case of a five-phase brushless motor, 144 degree square wave magnetization is necessary to suppress the torque pulsation to 5% or less.

The present invention is not based on maximally reducing the torque ripple, but is rather based on segmenting the torque ripple frequency range. As shown in FIG. 18 and FIG. 19, the torque change and the torque variation contain primarily a high frequency component, and a damping material is therefore inserted to the torque transmission system to absorb this high frequency component. To improve the steering feeling near the center steering position, it is necessary to suppress the cogging torque converted to a steering shaft equivalent to 0.3 N·m or less. As shown in FIG. 17, because the torque pulsation contains primarily a low frequency component, this low frequency component is suppressed in the torque control system by detection with a torque sensor and increasing the control frequency band of the torque control system. The torque pulsation is allowed to a maximum 10%.

A torque pulsation control method is described next in detail.

An object of the present invention is to prevent the torque pulsation (torque ripple feeling) from being felt. The driver can feel through the steering wheel torque pulsation of 0.3 N·m or greater on the steering shaft to a frequency of 60 Hz or less. It is therefore necessary to set the torque sensor detection hysteresis to 0.3 N·m or less ($A \leqq 0.3$ N·m in FIG. 8), and it is necessary to set the torque control system frequency band to at least 20 Hz or greater and 100 Hz or less.

The frequency of torque pulse occurrence is proportional to the product of the rotational speed of the brushless motor and the number of commutations per revolution, and we know from tests that it torque pulse is easily noticed by the driver when the frequency of occurrence is 5 Hz to 60 Hz. Therefore, it is important to set a high control gain between approximately 5 Hz and 60 Hz, lower sensitivity to interference torque (torque pulsation), and suppress the torque ripple feeling.

As shown in FIG. 15, the present invention comprises a control system that satisfies the above noted frequency band specification without affecting other aspects of performance. Shown here is an example in which this is accomplished with a robust stabilization compensator 203 and phase (advance/delay) compensator 204. The assistance characteristic gain is K, and the open loop transmission characteristic of the controller and mechanical system is approximately as shown in a below equation (5). Note that a1, a2, b1, b2 and b3 are parameters determined by the resonance frequency of the resonance system.

$$Gop(s)=(s+a1)\cdot b3\cdot K/\{(s+s2)\cdot(S^2+b1\cdot s+b2)\} \tag{5}$$

where the second degree equation of the denominator of the equation (5) is the characteristic of the mechanical system compensated by the robust stabilization compensator 203 after first compensating for friction and inertia in the brushless motor 210, and the remaining first degree items of the remaining numerator and denominator are phase advance/delay compensation. The closed loop transfer characteristic of the equation (5) is an equation (6) below. In the equation (6) c0, c1 and c2 are parameters determined by the resonance frequency of the resonance system.

$$Gc\mathbf{1}(s)=(s+a\mathbf{1})\cdot b\mathbf{3}\cdot K/\{(s+a\mathbf{2})\cdot(S^3+c\mathbf{0}\cdot S^2+c\mathbf{1}\cdot s+c\mathbf{2})\} \quad (6)$$

where c0, c1 and c2 are items obtained by expanding $(s+a\mathbf{1})\cdot(S^2+b\mathbf{1}\cdot s+b\mathbf{2})+b\mathbf{3}\cdot K$.

The desired closed loop is determined from an equation (7) below to achieve response from 5 Hz to 60 Hz and an interference suppressing function. In the equation (7) d0, d1, d2 and d3 are parameters determined by the resonance frequency of the resonance system.

$$Gc\mathbf{1}d(s)=(s+d\mathbf{3})\cdot b\mathbf{3}\cdot K/\{(s+d\mathbf{0})\cdot(S^2+d\mathbf{1}\cdot s+d\mathbf{2})\} \quad (7)$$

The desired response and interference suppressing function are obtained when the equation (6) and the equation (7) match. Therefore, denominator coefficients c0, c1 and c2 are determined by matching them to the expansions of $(s+d\mathbf{0})\cdot(s^2+d\mathbf{1}\cdot s+d\mathbf{2})$, and an coefficient al of the numerator is determined by making it match d3. Because in actuality gain K varies according to a function of the torque and vehicle speed, the above noted parameters must be determined with consideration for gain K. Further, this example is not the only available method, and a solution can be obtained by treating it as a design problem of H-infinity control, or using third degree or greater phase advance/delay compensation.

By using the frequency band shown in the equation (7), the constant gain is determined by the constant gain of assistance. Because interference torque can be suppressed regardless of the dynamic gain of the assistance characteristic in a specific frequency band (5 Hz to 60 Hz in the present embodiment), torque ripple compensation is possible in this frequency band.

APPLICATIONS IN INDUSTRY

As described above, a control apparatus for an electrical power steering apparatus according to the present invention analyzes torque ripple factors in a DC motor or brushless motor, reduces torque ripple by manipulating means corresponding to these factors, suppresses torque change and torque variation in a square wave drive brushless motor, and absorbs high frequency components that cannot be suppressed by the damping effect of the torque transmission system. Because low frequency components such as torque pulsation are allowed to the level that they can be controlled by the torque control system, torque ripple is detected using a torque sensor with low hysteresis, and the effects thereof are suppressed by the control system, it is possible to achieve a high output, small Dc motor or brushless motor, and reduce torque ripple at low cost without sacrificing cogging torque, and use [the present invention] in steering systems for a wide range of automobiles and vehicles.

What is claimed is:

1. A control apparatus for an electrical power steering apparatus for controlling a motor applying steering assistance force to a steering mechanism based on a current control value, said control apparatus comprising:

means for detecting a steering torque occurring at a steering shaft, wherein said steering torque detecting means has a hysteresis width of 0.3 N·m or less and a response frequency of 20 Hz or greater;

means for detecting a motor current of said motor;

means for calculating a steering assistance control value based on said steering torque that has been detected by said steering torque detecting means; and means for calculating said current control value based on said motor current and said steering assistance control value, wherein said control apparatus has a torque control frequency band of 20 Hz or greater, and wherein, based on said current control value, said control apparatus restrains a torque ripple of said motor within 10% of an average level of the torque.

2. A control apparatus for an electrical power steering apparatus as described in claim 1, wherein the frequency band of torque control is from 20 Hz to 100 Hz.

3. A control apparatus for an electrical power steering apparatus as described in claim 1, wherein a control gain of said torque control in a specific band, which is from 5 Hz to 60 Hz, is greater than where outside said specific band.

4. A control apparatus for an electrical power steering apparatus as described in claims 1, 2 or 3, wherein the motor is a DC motor.

5. A control apparatus for an electrical power steering apparatus as described in claims 1, 2, or 3, wherein the motor is a brushless motor.

* * * * *